(12) United States Patent
Cheng et al.

(10) Patent No.: US 11,126,813 B2
(45) Date of Patent: Sep. 21, 2021

(54) FINGERPRINT SENSING DEVICE

(71) Applicants: Egis Technology Inc., Taipei (TW); Igistec Co., Ltd., Hsinchu County (TW)

(72) Inventors: Ming-Yuan Cheng, Hsinchu County (TW); Chung-Yi Wang, Hsinchu County (TW); Sung-Hua Chen, Hsinchu County (TW); Yu-Hsuan Lin, Hsinchu County (TW)

(73) Assignees: Egis Technology Inc., Taipei (TW); Igistec Co., Ltd., Hsinchu County (TW)

( * ) Notice: Subject to any disclaimer, the term of this patent is extended or adjusted under 35 U.S.C. 154(b) by 0 days.

(21) Appl. No.: 16/840,464

(22) Filed: Apr. 6, 2020

(65) Prior Publication Data

US 2020/0349335 A1 Nov. 5, 2020

Related U.S. Application Data

(60) Provisional application No. 62/840,419, filed on Apr. 30, 2019.

(30) Foreign Application Priority Data

Feb. 21, 2020 (CN) .......................... 202010107117.5

(51) Int. Cl.
  *G06K 9/00* (2006.01)
(52) U.S. Cl.
  CPC ................................ *G06K 9/00013* (2013.01)
(58) Field of Classification Search
  CPC . G06K 9/00013; G06K 9/2036; G06K 9/0004
  See application file for complete search history.

(56) References Cited

U.S. PATENT DOCUMENTS

2014/0355846 A1* 12/2014 Lee ...................... G06K 9/0004
  382/124
2018/0012069 A1* 1/2018 Chung ................. G06K 9/2036
2018/0129852 A1 5/2018 Zeng et al.
2018/0357460 A1 12/2018 Smith et al.

* cited by examiner

*Primary Examiner* — Abhishek Sarma
(74) *Attorney, Agent, or Firm* — JCIPRNET

(57) ABSTRACT

The invention provides a fingerprint sensing device. A control circuit controls a part of point light sources to irradiate a fingerprint of a user. Reflected light generated by using the plurality of point light sources to irradiate the fingerprint of the user forms a light-emitted pattern including a plurality of reflected light patterns on a sensing layer, wherein each of the reflected light patterns is provided by a corresponding point light source, and each of the sensing units senses the reflected light patterns corresponding to at least two point light sources.

7 Claims, 2 Drawing Sheets

FINGERPRINT SENSING DEVICE

CROSS-REFERENCE TO RELATED APPLICATION

This application claims the priority benefit of U.S. application Ser. No. 62/840,419, filed on Apr. 30, 2019 and China application serial no. 202010107117.5, filed on Feb. 21, 2020. The entirety of each of the above-mentioned patent applications is hereby incorporated by reference herein and made a part of this specification.

BACKGROUND

Technical Field

The invention relates to a sensing device, and particularly relates to a fingerprint sensing device.

Description of Related Art

In recent years, biometric technology has been developed rapidly. Since security codes and access cards may be easily stolen or lost, more attentions have been paid to fingerprint recognition technology. Fingerprints are unique and invariant, and each person has multiple fingers used for identity recognition. Moreover, a fingerprint sensor may be used to easily obtain fingerprints. Therefore, through fingerprint recognition, security and convenience may be improved, and better protection on financial security and confidential data is achieved.

Generally, fingerprint recognition devices are often installed in electronic products (such as smart phones, tablet computers, etc.) with display elements, and fingerprint recognition is accomplished by using a light beam emitted by a display element (such as an organic light emitting diode display panel) to irradiate a fingerprint. When the conventional fingerprint recognition device uses the light beam emitted by the display element to irradiate the fingerprint, all point light sources corresponding to a fingerprint sensing area have to be turned on to generate reflected light, and the reflected light may form reflected light patterns on a light sensing element. Since the point light sources corresponding to the fingerprint sensing area are all turned on, a cross effect will be caused by the multiple point light sources. The cross effect may cause the fingerprint image received by the light sensing element to be formed by overlapping the reflected light patterns corresponding to too many point light sources. As such, the fingerprint image is hard to be recognized.

SUMMARY

The invention is directed to a fingerprint sensing device, which is adapted to provide a clear fingerprint image, thereby improving fingerprint recognition quality.

The invention provides a fingerprint sensing device including a glass cover, a sensing layer, a light source layer, and a control circuit. The sensing layer includes a plurality of sensing units. The light source layer includes a plurality of point light sources. The control circuit is coupled to the sensing layer and the light source layer, and controls a part of the point light sources to irradiate a fingerprint of a user, wherein reflected light generated by using the plurality of point light sources to irradiate the fingerprint of the user forms a light-emitted pattern including a plurality of reflected light patterns on the sensing layer, wherein each of the reflected light patterns is provided by a corresponding point light source, and each of the sensing units senses the reflected light patterns corresponding to at least two point light sources.

Based on the above description, the control circuit of the invention controls a part of the point light sources to irradiate the fingerprint of the user. The reflected light generated by the fingerprint forms a light-emitted pattern including a plurality of reflected light patterns on the sensing layer, where each of the reflected light patterns is provided by a corresponding point light source, and each of the sensing units senses the reflected light patterns corresponding to at least two point light sources. Therefore, fingerprint image blurring caused by a cross effect of the point light sources is effectively mitigated, thereby improving the quality of fingerprint recognition.

To make the aforementioned more comprehensible, several embodiments accompanied with drawings are described in detail as follows.

DESCRIPTION OF THE EMBODIMENTS

Figure 1:
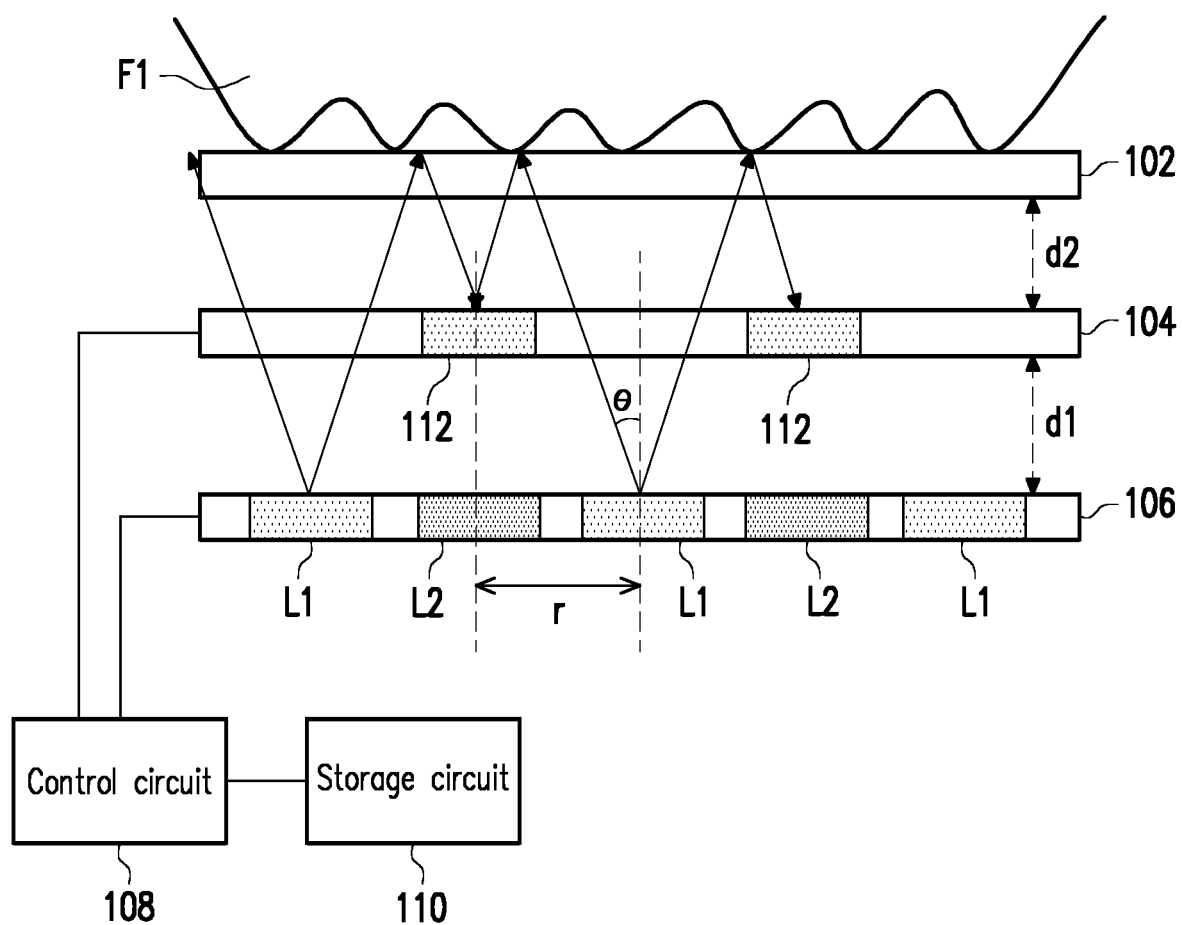
FIG. 1 is a schematic diagram of a fingerprint sensing device according to an embodiment of the invention.

FIG. 1 is a schematic diagram of a fingerprint sensing device according to an embodiment of the invention. Referring to FIG. 1, the fingerprint sensing device may include a glass cover 102, a sensing layer 104, a light source layer 106, a control circuit 108, and a storage circuit 110, where the control circuit 108 is coupled to the sensing layer 104, the light source layer 106 and the storage circuit 110, and the sensing layer 104 is disposed between the glass cover 102 and the light source layer 106.

The glass cover 102 may receive a finger F1 of a user when performing fingerprint recognition. The sensing layer 104 includes a plurality of sensing units 112, and the sensing units 112 are configured to sense a fingerprint image of the user, where each of the sensing units 112 may include, for example, at least one light sensor. The storage circuit 110 may store characteristic data of a fingerprint. The light source layer 106 includes a plurality of point light sources, and the light source layer 106 may be, for example, a display panel, and the point light sources may be, for example, display pixels on the display panel. The control circuit 108 may control a part of the point light sources to irradiate the finger F1 of the user to generate reflected light. For example, as shown in FIG. 1, the control circuit 108 may control point light sources L1 in the light source layer 106 to provide light beams and disable point light sources L2. Therefore, reflected light generated by the point light sources L1 and finger may form a light-emitted pattern composed of a plurality of reflected light patterns on the sensing layer 104. Each of the reflected light patterns is provided by a corresponding point light source, and the single sensing unit 112 may sense the reflected light patterns corresponding to at least two point light sources L1. For example, the shape of reflected light patterns may be circle, and a closed area formed by centers of the plurality of adjacent reflected light patterns includes intersections or areas formed by the plurality of adjacent reflected light patterns. A sensing surface of each sensing unit 112 may include, for example, the closed area formed by the centers of the plurality of adjacent reflected light patterns to sense the adjacent reflected light patterns, or the sensing surface of each sensing unit 112 may only include a partial area of each of the two adjacent reflected light patterns.

Figure 2:
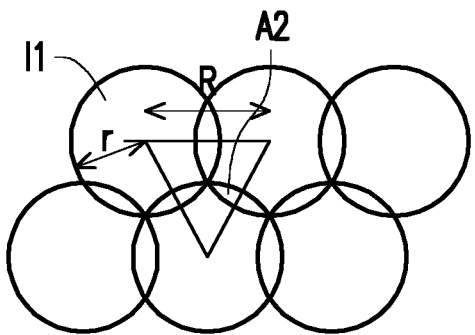
FIG. 2 to FIG. 6 are schematic diagrams of light-emitted patterns according to an embodiment of the invention.

For example, the light-emitted pattern may be as shown in FIG. 2, and in the embodiment of FIG. 2, the shape of each reflected light pattern I1 is circle with a preset radius r, and a distance R between two adjacent reflected light patterns I1 is slightly smaller than twice of the preset radius r. Further, the preset radius r may be represented by a following equation:

$$r=(d1+d2)\times\tan\theta+d2\times\tan\theta \quad (1)$$

where d1 is a distance between the sensing layer 104 and the light source layer 106, d2 is a distance between the sensing layer 104 and the glass cover 102, θ is an emerging angle of a light beam provided by the point light source L1, and is also an incident angle of the light beam provided by the point light source L1 and incident to the glass cover 102.

As shown in FIG. 2, connection lines of centers of three adjacent reflected light patterns I1 form a regular triangle, and the sensing surface of a single sensing unit 112 may, for example, include the closed area formed by the centers of the three adjacent reflected light patterns I1 to sense the three adjacent reflected light patterns I1, or the sensing surface of the single sensing unit 112 may also include only a partial area of each of the two adjacent reflected light patterns I1.

In the embodiment of FIG. 2, the reflected light patterns I1 may be overlapped with each other in a small part, for example, the distance R between the circle centers of two adjacent reflected light patterns I1 may be slightly smaller than twice of the preset radius r (for example, 1.5r to 1.8r, but the invention is not limited thereto). In this way, appearance of an area that is not irradiated by the reflected light between the reflected light patterns I1 is avoided, and it is ensured that the sensing units 112 receive a complete fingerprint image. For example, in the embodiment of FIG. 2, the regular triangle formed by the connection lines of the centers of the three adjacent reflected light patterns I1 includes overlapped areas A2 formed by overlapping every two adjacent reflected light patterns I1 and areas formed by each single reflected light pattern I1, and does not include an area that is not irradiated by the reflected light.

Moreover, since the distance R between the adjacent reflected light patterns I1 is only slightly smaller than twice of the preset radius r, a situation of overlapping the reflected light patterns corresponding to too many point light sources due to a cross effect of the point light sources is avoided, and a brightness of the light-emitted pattern may be improved without affecting clarity of the fingerprint image, so that the sensing units 112 may sense the clear fingerprint image more easily. Therefore, by properly designing an arrangement method of the reflected light patterns I1 and the distance R between the reflected light patterns I1, it is ensured that the sensing units 112 sense the clear fingerprint image. The control circuit 108 may compare a sensing result from the sensing units 112 with the characteristic data stored in the storage circuit 110 for fingerprint recognition, and since the sensing units 112 may sense the clear fingerprint image, a success rate of the fingerprint recognition may be greatly improved, so as to effectively improve quality of the fingerprint recognition.

Figure 3:
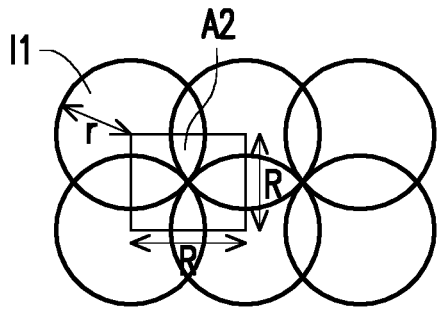

In some embodiments, the light-emitted pattern is not limited to the pattern shown in FIG. 2. For example, the light-emitted pattern may also be as that shown in FIG. 3. In the embodiment of FIG. 3, the distance R between the adjacent reflected light patterns I1 is also slightly smaller than twice of the preset radius r, and connection lines of centers of four adjacent reflected light patterns I1 form a rectangle. Similarly, the sensing surface of the single sensing unit 112 may include, for example, a closed area formed by the centers of the four adjacent reflected light patterns I1 to sense the four adjacent reflected light patterns I1, or the sensing surface of the single sensing unit 112 may only include a partial area of each of the two adjacent reflected light patterns I1. Since the area that is not irradiated by the reflected light is not appeared between the reflected light patterns I1 in the embodiment of FIG. 3 either, and the distance R between the adjacent reflected light patterns I1 is also slightly smaller than twice of the preset radius r, the sensing units 112 of the embodiment may also sense a complete and clear fingerprint image, which greatly improves the success rate of fingerprint recognition, and effectively improves the quality of fingerprint recognition.

Figure 4:
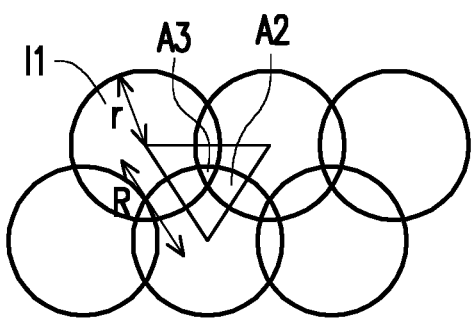

In another example, compared with the embodiment of FIG. 2, in the embodiment of FIG. 4, the distances R between the centers of the three adjacent reflected light patterns I1 are closer, and besides that the regular triangle formed by the connection lines of the centers of the three adjacent reflected light patterns I1 includes the overlapped areas A2 formed by overlapping every two adjacent reflected light patterns I1, the regular triangle further includes an overlapped area A3 formed by overlapping the three adjacent reflected light patterns I1.

Figure 5:
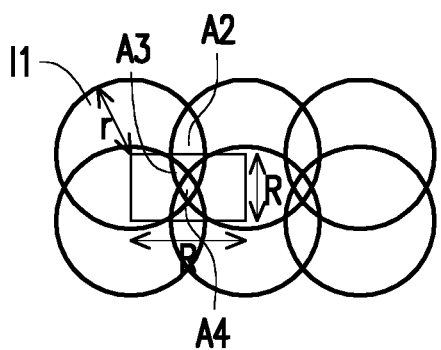

In yet another example, compared with the embodiment of FIG. 3, in the embodiment of FIG. 5, the distances R between the centers of the four adjacent reflected light patterns I1 are even closer, and besides that the rectangle formed by the connection lines of the centers of the four adjacent reflected light patterns I1 includes the overlapped areas A2 formed by overlapping every two adjacent reflected light patterns I1, the rectangle further includes overlapped areas A3 formed by overlapping every three adjacent reflected light patterns I1, and an overlapped area A4 formed by overlapping the four adjacent reflected light patterns I1.

Figure 6:
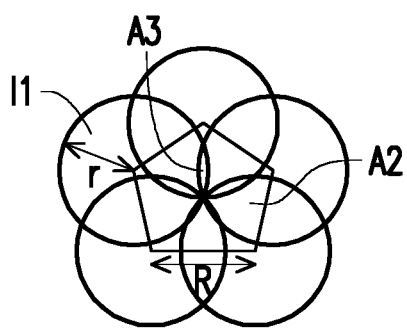

In yet another example, in the embodiment of FIG. 6, the connection lines between the centers of the five adjacent reflected light patterns I1 form a pentagon, and the pentagon formed by the connection lines between the centers of the five adjacent reflected light patterns I1 does not include an area that is not irradiated by the reflected light, and the pentagon includes overlapped areas A2 formed by overlapping every two adjacent reflected light patterns I1, and overlapped areas A3 formed by overlapping every three adjacent reflected light patterns I1. The sensing surface of the sensing unit 112 may, for example, include the closed area formed by the centers of the five adjacent reflected light patterns I1 to sense the five adjacent reflected light patterns I1. In other embodiments, the sensing surface of the sensing unit 112 may also include only a partial area of each of the two, three, or four adjacent reflected light patterns I1 according to a configuration of the sensing unit 112.

It should be noted that in the embodiment of FIG. 1, the control circuit 108 controls the point light sources to emit light at intervals in space, i.e., one point light source L2 that does not emit light is included between the point light sources L1 corresponding to two adjacent reflected light patterns, and each of the sensing units 112 may sense the reflected light patterns corresponding to two point light sources L1. However, in other embodiments, according to factors such as a distribution status of the point light sources, a light emitting angle, etc., the control circuit 108 may also make a plurality of point light source L2 that does not emit light to be included between the point light sources L1 corresponding to two adjacent reflected light patterns, so as to form a required light-emitted pattern on the sensing layer 104, and make the distance between the centers of the two adjacent reflected light patterns to be slightly smaller than twice of the preset radius r. Moreover, in some embodiments, the sensing units 112 may also be disposed in the light source layer 106, and the preset radius r may be represented by a following equation:

$$r=2(d1+d2) \times \tan\theta \qquad (2)$$

Similarly, the light-emitted pattern on the light source layer 106 may also be implemented in the manner shown in FIG. 2 to FIG. 6, but the invention is not limited thereto. Since the implementations of the light-emitted patterns have been described in detail in the aforementioned embodiment, details thereof are not repeated.

Moreover, since each user has a different fingerprint, the light-emitted patterns corresponding to the fingerprints of different users that may be used to obtain the best fingerprint sensing results may also be different. In some embodiments, the light-emitted pattern corresponding to the user that may be used to obtain the best fingerprint sensing result may be taken as an exclusive light-emitted pattern of the user. For example, the storage circuit 110 may store a plurality of default light emitting modes, where each of the default light emitting modes may correspond to a plurality of different light-emitted patterns. When the user performs a fingerprint setting operation, the control circuit 108 may control a part of the point light sources to irradiate the fingerprint of the user according to the plurality of default light emitting modes stored in the storage circuit 110, and select the light-emitted pattern with the highest signal-to-noise ratio as the characteristic data of the user according to the sensing result from the sensing units 112. In this way, besides that the control circuit 108 may recognize the user based on the fingerprint image sensed by the sensing units 112, the control circuit 108 may further change the light-emitted pattern according to the default light emitting mode, and recognize the user according to whether the light-emitted pattern with the highest signal-to-noise ratio corresponding to the user matches the set light-emitted pattern, so as to further improve security of an electronic device using fingerprint sensing device.

In summary, the control circuit of the invention controls a part of the point light sources to irradiate the fingerprint of the user. The reflected light generated by using the plurality of point light sources to irradiate the fingerprint of the user forms a light-emitted pattern including a plurality of reflected light patterns on the sensing layer, where each of the reflected light patterns is provided by a corresponding point light source, and each of the sensing units senses the reflected light patterns corresponding to at least two point light sources. In this way, fingerprint image blurring caused by a cross effect of the point light sources is effectively mitigated, thereby improving the quality of fingerprint recognition. In some embodiments, the light-emitted pattern may be changed according to the default light emitting mode, and the user is recognized according to whether the light-emitted pattern with the highest signal-to-noise ratio corresponding to the user matches the set light-emitted pattern, so as to further improve security of the electronic device using fingerprint sensing device.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A fingerprint sensing device, comprising:
   a glass cover;
   a sensing layer, comprising a plurality of sensing units;
   a light source layer, comprising a plurality of point light sources; and
   a control circuit, coupled to the sensing layer and the light source layer, and controlling a part of the point light sources to irradiate a fingerprint of a user,
   wherein reflected light generated by the fingerprint forms a light-emitted pattern comprising a plurality of reflected light patterns on the sensing layer, wherein each of the reflected light patterns is provided by a corresponding point light source, and each of the sensing units senses the reflected light patterns corresponding to at least two point light sources,
   wherein the shape of the reflected light patterns is circle with a preset radius, and a distance between centers of two adjacent reflected light patterns is smaller than twice of the preset radius.

2. The fingerprint sensing device as claimed in claim 1, wherein at least one point light source between the point light sources which corresponding to two adjacent reflected light patterns, does not emit light.

3. The fingerprint sensing device as claimed in claim 1, wherein a closed area formed by the centers of the plurality of reflected light patterns comprises intersections or areas formed by the plurality of adjacent reflected light patterns.

4. The fingerprint sensing device as claimed in claim 1, wherein the sensing layer is disposed between the glass cover and the light source layer, and the preset radius is represented by a following equation:

$$r=(d1+d2) \times \tan\theta + d2 \times \tan\theta$$

where r is the preset radius, d1 is a distance between the sensing layer and the light source layer, d2 is a distance between the sensing layer and the glass cover, θ is an incident angle of incident light provided by the point light source and incident to the glass cover.

5. The fingerprint sensing device as claimed in claim 1, further comprising:
   a storage circuit, coupled to the control circuit, and storing characteristic data of the fingerprint, wherein the control circuit compares a sensing result from the plurality of sensing units with the characteristic data to perform fingerprint recognition.

6. The fingerprint sensing device as claimed in claim 5, wherein the storage circuit further stores a plurality of default light emitting modes, wherein the default light emitting modes correspond to a plurality of different light-emitted patterns, when the user performs a fingerprint setting operation, the control circuit controls a part of the point light sources to irradiate the fingerprint of the user according to the plurality of default light emitting modes, and selects the light-emitted pattern with the highest signal-to-noise ratio as the characteristic data of the user according to the sensing result from the plurality of sensing units.

7. The fingerprint sensing device as claimed in claim 1, wherein the light source layer is a display panel, and the plurality of point light sources are display pixels.

\* \* \* \* \*